Jan. 23, 1968  L. E. COOPER ET AL  3,365,557

PRESSURE RESPONSIVE DIAPHRAGM OPERATED DEVICE

Original Filed Aug. 23, 1961  4 Sheets-Sheet 1

INVENTORS:
LAWRENCE E. COOPER,
EDMUNDS KADISEVSKIS,
BY Harold Levine ATT'Y.

Jan. 23, 1968   L. E. COOPER ET AL   3,365,557
PRESSURE RESPONSIVE DIAPHRAGM OPERATED DEVICE
Original Filed Aug. 23, 1961   4 Sheets-Sheet 3
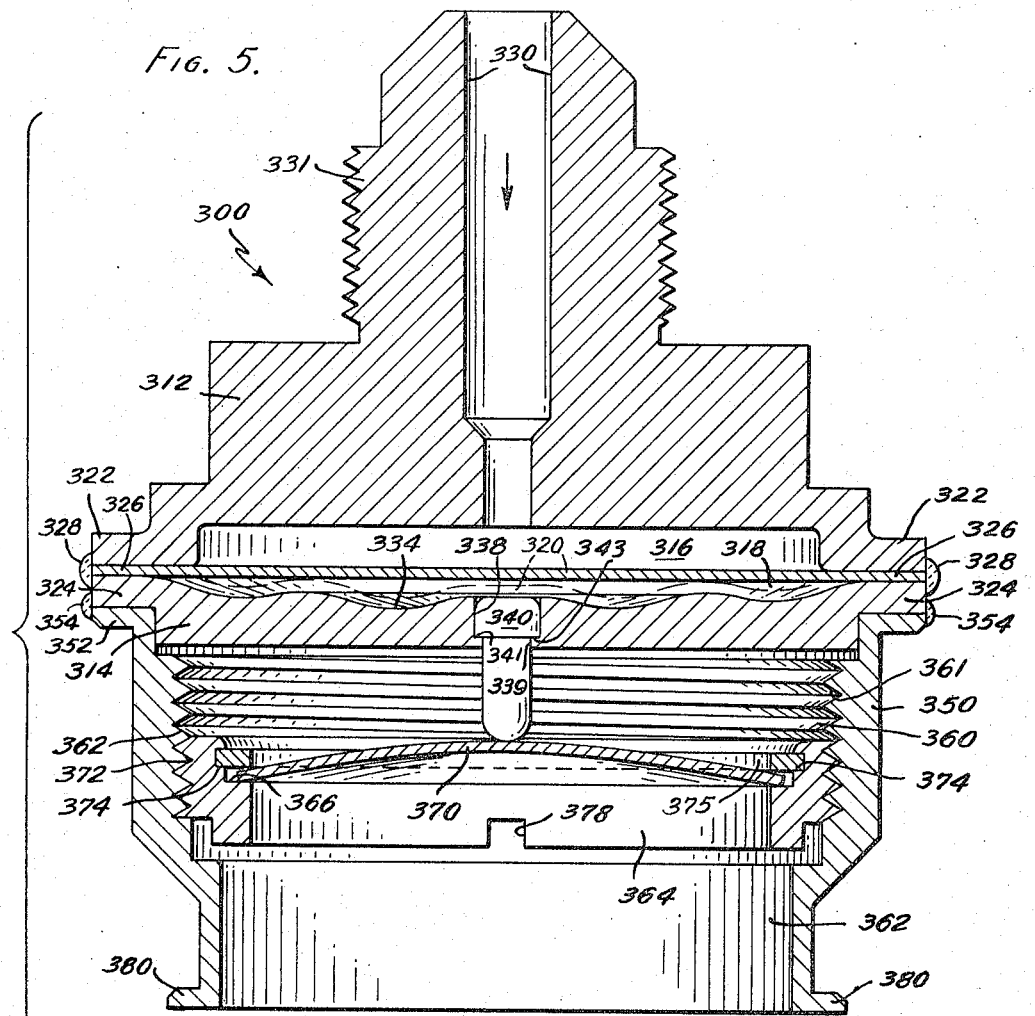
FIG. 5.
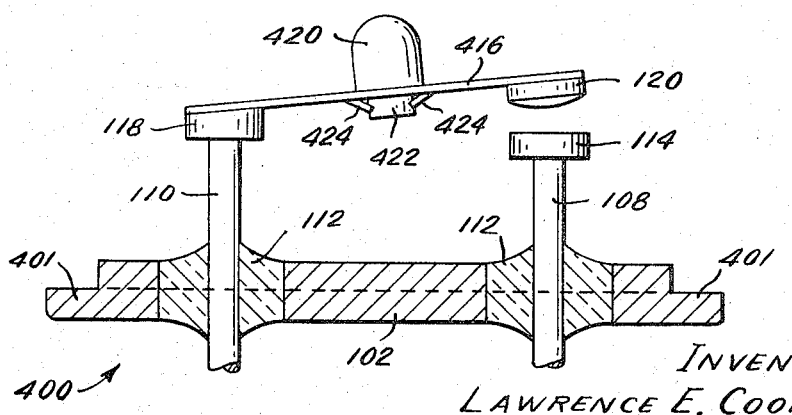
INVENTORS:
LAWRENCE E. COOPER,
EDMUNDS KADISEVSKIS,
BY Harold Levine
ATT'Y.

Jan. 23, 1968   L. E. COOPER ET AL   3,365,557
PRESSURE RESPONSIVE DIAPHRAGM OPERATED DEVICE
Original Filed Aug. 23, 1961   4 Sheets-Sheet 4

INVENTORS:
LAWRENCE E. COOPER,
EDMUNDS KADISEVSKIS,
BY Harold Levine ATT'Y.

United States Patent Office 3,365,557
Patented Jan. 23, 1968

3,365,557
PRESSURE RESPONSIVE DIAPHRAGM
OPERATED DEVICE
Lawrence E. Cooper, Attleboro, Mass., and Edmunds Kadisevskis, Pawtucket, R.I., assignors to Texas Instruments Incorporated, Dallas, Tex., a corporation of Delaware
Continuation of application Ser. No. 133,385, Aug. 23, 1961. This application Feb. 2, 1965, Ser. No. 432,067
11 Claims. (Cl. 200—83)

This application is a continuation of application Ser. No. 133,385, filed Aug. 23, 1961, now abandoned.

This invention relates generally to condition-responsive devices, and methods of making the same, and in particular with regard to certain more specific features, to pressure-responsive devices particularly adapted for actuating electrical switches.

Among the several objects of the invention may be noted the provision of pressure-responsive devices which are particularly adapted for miniaturization and light-weight hermetically sealed constructions, and methods of making the same; the provision of such devices which include means enabling the pressure-sensing means to withstand relatively large overpressures without incurring deleterious changes in calibrations; the provision of such pressure-responsive devices, and methods of making the same, which devices can be easily and inexpensively calibrated; the provision of such devices, and methods of making the same, wherein a pressure-responsive diaphragm employed therein can conveniently and economically be formed, for either snap action or creep action, after the diaphragm, in blank form, has been mounted and incorporated in a subassembly of the device; the provision of new and improved pressure-responsive devices, and methods of making the same, which employ a diaphragm member which acts as a seal to separate and seal one compartment or cavity in said device from another; and the provision of new and improved devices which are responsive to a combination of predetermined pressure and temperature conditions.

Other objects will be in part apparent and in part pointed out hereinafter.

The invention accordingly comprises the elements and combinations of elements, steps and sequence of steps, features of construction and manipulation, and arrangements of parts, all of which will be exemplified in the structures and methods hereinafter described, and the scope of the application of which will be indicated in the following claims.

In the accompanying drawings, in which several of various possible embodiments of the invention are illustrated:

FIG. 5 is an exploded, elevational view, partly in section, of a pressure-responsive device, according to yet another embodiment;

Figure 1:
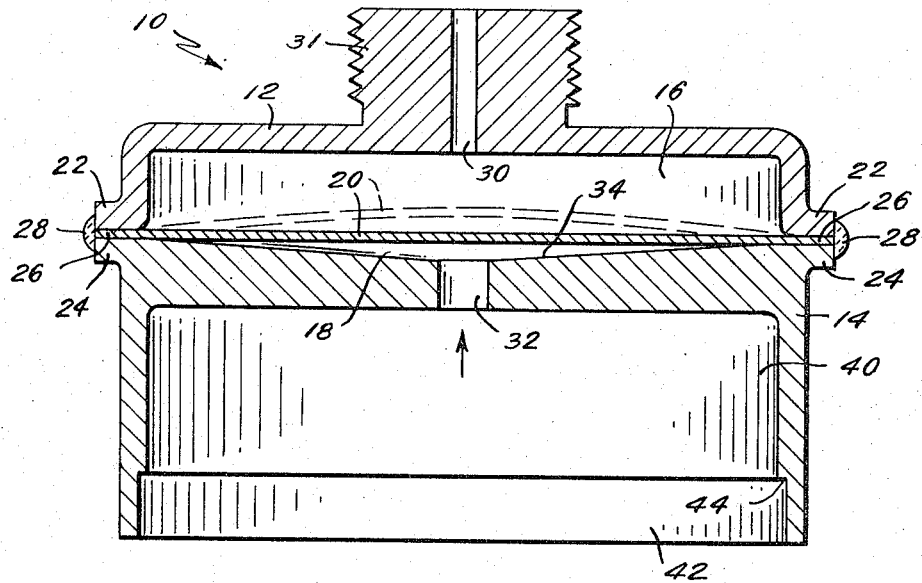
FIG. 1 is an axial section of a primary subassembly of parts useful for constructing a pressure-responsive device, according to the FIGS. 2-4 forms of the present invention.

Dimensions of certain of the parts as shown in the drawings, and relative movements between parts, have been modified and/or exaggerated for the purposes of clarity of illustration.

Similar reference characters indicate corresponding parts throughout the several views of the drawings.

The pressure-responsive devices embodying the invention have many useful applications wherein it is desirable to provide sudden or rapid changes in output actuation forces whenever the pressure from an independent source reaches either one of two selective limit values. For example, a pressure-responsive or combined temperature-pressure responsive device according to this invention, may be used in connection with an electrical switch or with a valve or other mechanism or device for which actuation is desired in response to predetermined changes in pressure. The present invention contemplates the provision of both the snap-acting and creep-acting type of pressure-sensing device, as well as a thermotropic pressure-sensing type device.

Figure 5A:
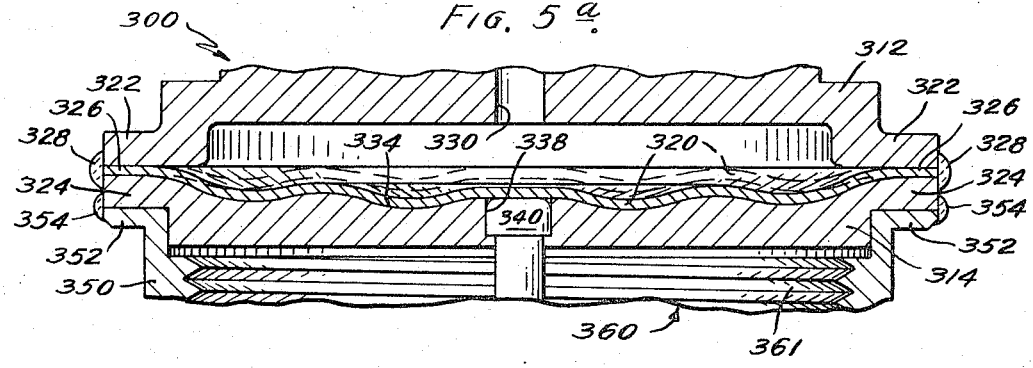
FIG. 5a is a fragmentary, elevational, sectional view of the device shown in FIG. 1, showing the relative position of parts after the forming operation.
Figure 6:
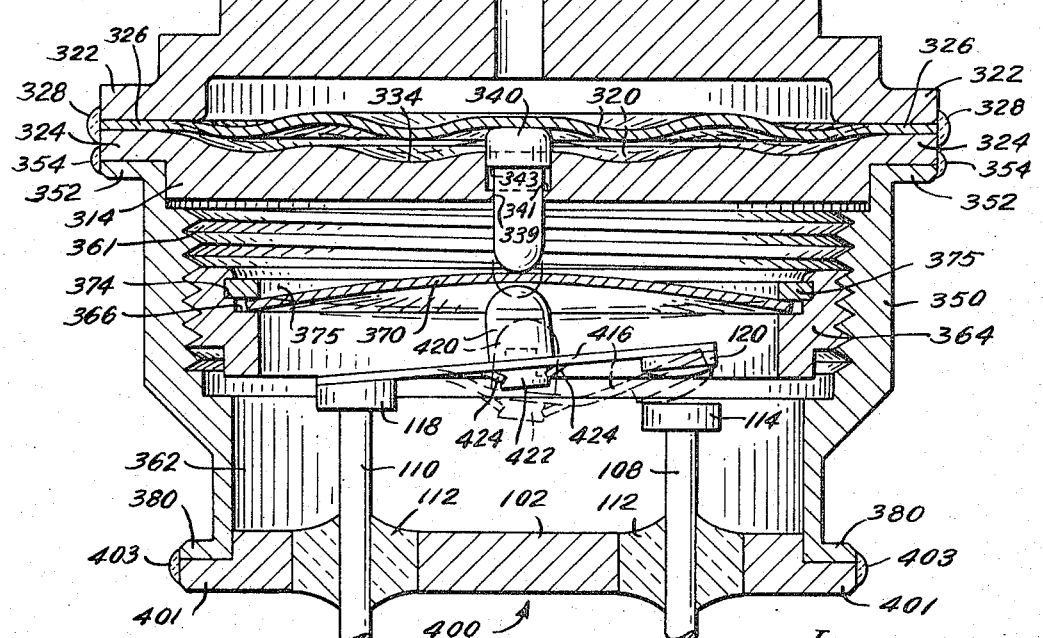
FIG. 6 is a sectional, elevational view of the pressure-responsive device shown in FIG. 5, in assembled operational form.

Briefly, the present invention involves providing a primary subassembly of two casing members having opposed cavities; locating a diaphragm member (either in flat blank or partially preformed blank form) intermediate the casing members; securing each of the casing members to the diaphragm blank adjacent its marginal periphery, as by welding, whereby the diaphragm member separates and seals each of the compartments or cavities from each other. Thereafter, fluid pressure is applied into one of the cavities against the diaphragm blank to stress and deform the diaphragm blank into a predetermined actuating configuration. This configuration, according to the embodiments of FIGS. 2-4 of the invention, is a snap-acting configuration, and the configuration according to the embodiments of FIGS. 5 and 6, is a convoluted, creep-acting type configuration. Thereafter, a mechanism (by way of example, an electrical switch) is mounted on the primary subassembly for actuation in response to motion generated by the diaphragm member.

The present invention also provides simple and expedient means for calibrating the pressure-sensing diaphragm members, and also provides stop means for the diaphragm member whereby it can be exposed to considerable overpressures without incurring deleterious changes in calibration thereof.

The relative simplicity and relatively small number of parts comprising the pressure-responsive devices according to the present invention, advantageously permit miniaturization and light-weight construction.

Figure 2:
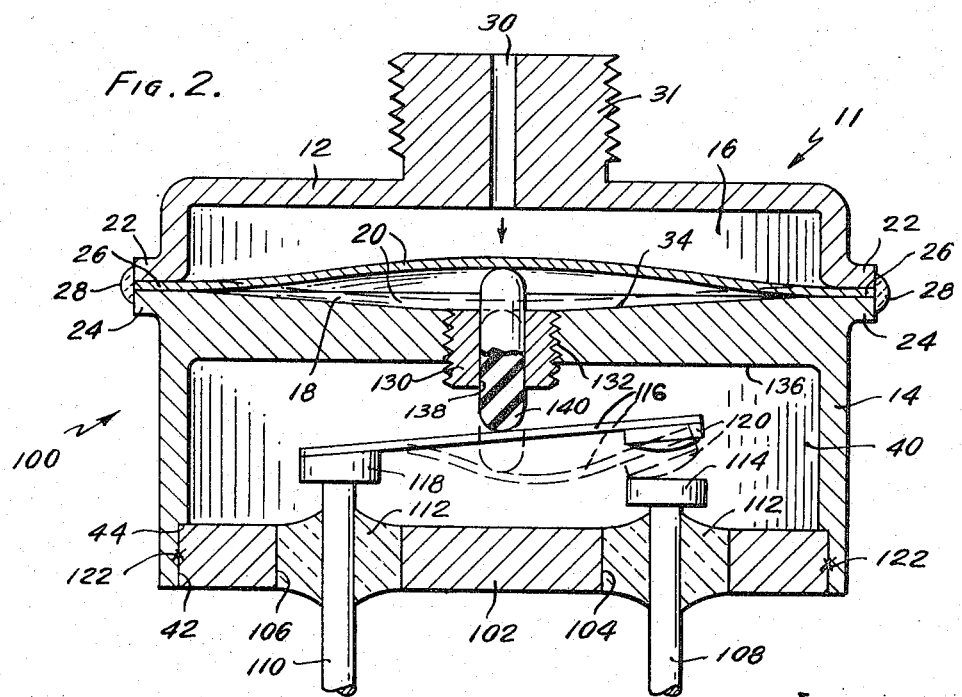
FIG. 2 is a view similar to FIG. 1, of a completed pressure-responsive device, according to a first embodiment of the present invention.
Figure 3:
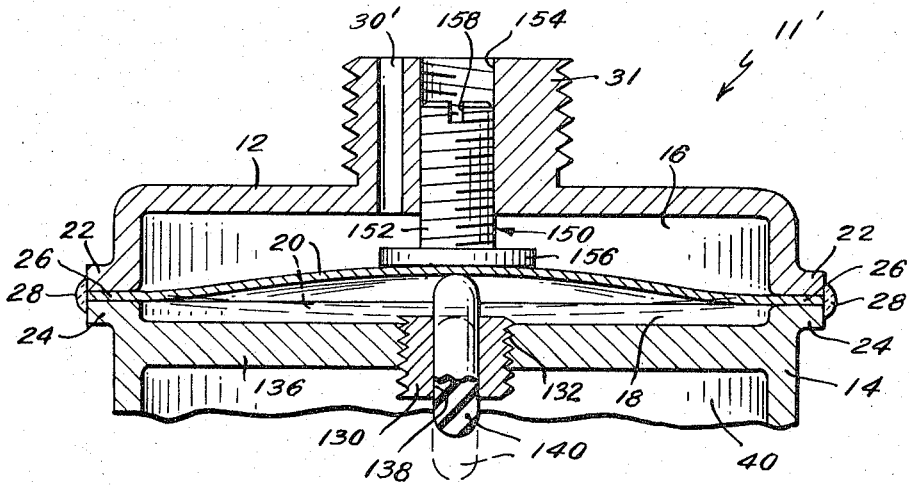
FIGS. 3 and 4 are fragmentary, axial, sectional views similar to FIG. 2, of pressure-responsive devices respectively according to a second and third embodiment of the invention.
Figure 4:
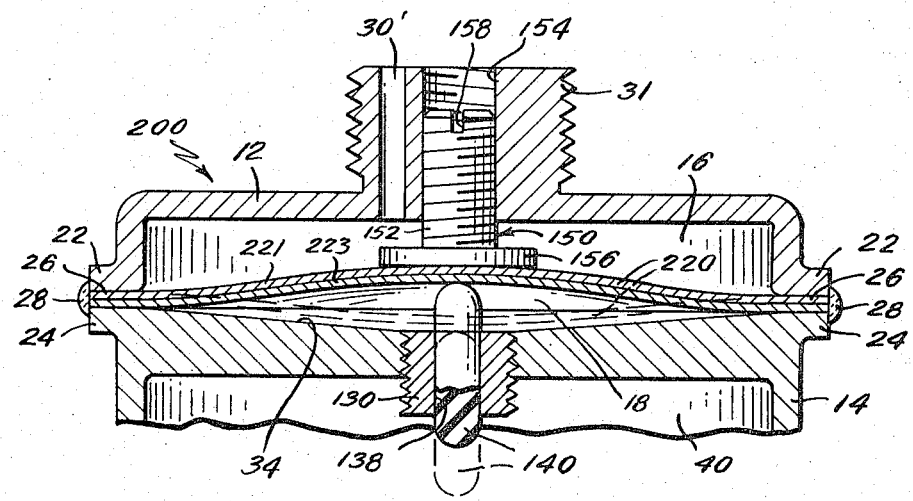

Referring now more particularly to FIG. 1 of the drawings, there is shown a primary subassembly generally indicated at numeral 10, of a type useful for the FIGS. 2-4 forms of the invention. There is shown, at numerals 12 and 14, two casing members formed, for example, of stainless steel, and which respectively provide cavities or compartments 16 and 18, which face each other when the parts are assembled, as shown in FIG. 1. Each of casing members 12 and 14 are respectively provided with peripherally extending, opposed and aligned flanges 22 and 24. Subassembly 10 includes an imperforate diaphragm member 20, preferably a relatively thin metal (e.g. stainless steel) flat disc blank of substantially uniform thickness, which is positioned intermediate casing members 12 and 14, as shown. Flanges 22 and 24 are each fixedly and rigidly secured to the marginal periphery 26 of diaphragm member 20, as by heliarc welding, as at 28, whereby diaphragm member 20 not only separates, but also seals, compartment 16 from compartment 18. Although it is preferred that housing or casing members 12 and 14 be welded to the marginal periphery of diaphragm member 20, it will be understood that other means may be employed to clamp and seal the diaphragm member between the casing members 12 and 14.

Casing members 12 and 14 are cylindrical in shape, providing a cup-shaped configuration illustrated in FIG. 1. Diaphragm 20 is also circular in shape, and corresponds to the cylindrical configuration of casing members 12 and 14, as shown. It should be noted, however that casing members 12 and 14, and diaphragm blank 20, may have other convenient cross-sectional configurations, for example, rectangular, octagonal, or other polygonal shapes.

Casing 12 is provided with an externally threaded projecting portion 31 in which is provided an orifice or port aperture 30, which communicates with cavity 16 and which may serve as an inlet to admit a source of pressure to which the diaphragm is to respond. Threaded portion 31 is for the purpose of mounting and securing the pressure-responsive device to a source of pressure which is to be sensed. Generally, because of the light-weight and miniaturized construction afforded by the pressure-sensing devices of the present invention, the fitting 31 can constitute the only mounting required for the device 11. Casing member 14 also provides an aperture or orifice 32, as shown.

According to the invention, after the parts have been assembled, as described above, a forming operation takes place. A controlled fluid pressure, preferably hydraulic, is applied into cavity 18 through aperture 32, against the underside of diaphragm member 20, in the direction of the arrow as seen in FIG. 1. The pressure applied against diaphragm member 20 bulges the diaphragm member upwardly, and permanently stresses and deforms the diaphragm member to assume a snap-acting configuration, shown in dashed lines in FIG. 1. This snap-acting configuration may, for example, include a so-called nondevelopable portion which will provide for snap-acting operation. The principle of operation of the nondevelopable surface in providing for snap action in thermotropic devices, is described in U.S. Patent No. 1,448,240 to Spencer. The forming pressure admitted into cavity or compartment 18 is regulated and will vary depending upon the amount of bulge or deformation and the diaphragm operating characteristics desired. It has been found that for a given material thickness and size of the diaphragm, there is a correlation between the forming pressures and the pressures at which snap action or flexure (in the case of a creep-type diaphragm) will occur. Thus, by varying the forming pressures, a wide variety of differently rated pressure-responsive devices can be made.

After formation of the diaphragm 20 into its snap-acting configuration (as shown in dashed lines in FIG. 1) the snap-acting diaphragm may be tested to determine its snapping pressure by appropriately applying pressure through port or orifice 30.

The monometallic, inherently snap-acting diaphragm or disc in the FIGS. 2 and 3 embodiments, and the composite, thermally responsive, snap-acting disc of the FIG. 4 embodiment, to be described below, are of the so-called automatic resetting or monostable type, i.e., the snap-acting element has only one position of relative stability (e.g. that position shown in dashed lines in FIG. 1 and in solid lines in FIG. 2) and when the element snaps to an opposite, unstable configuration (e.g. shown in dashed lines in FIGS. 2 and 3) its inherent spring force tends to snap it back to its stable configuration which will automatically occur when the forces acting on the element tending to keep it in its unstable position, are either removed or diminished sufficiently to the extent where they are overcome by the spring forces in the element.

FIGURE 2 EMBODIMENT

A completed pressure-responsive device, including a primary subassembly, similar to that shown in FIG. 1, and a mechanism for actuation by the pressure sensing diaphragm according to one embodiment, is shown in FIG. 2, and indicated generally at 11. The exemplary mechanism to be actuated by the pressure-sensing mechanism in the embodiment of FIG. 2, has been illustrated in the form of an electrical switch generally referred to by numeral 100. Electrical switch 100 is preferably of the hermetically sealed type.

Casing member 14 is cup-shaped, and provides a recess or cavity 40 for the reception of electrical switch 100. Electrical switch 100 comprises a metallic header plate 102 which provides a pair of apertures 104 and 106 in which are respectively disposed in hermetically sealed relationship, electrically conducting terminals 108 and 110. A glass sealant 112 is applied about each of terminals 108 and 110 in open-ended apertures 104 and 106 to hermetically seal and maintain terminals 108 and 110 in electrically insulated, spaced relation with respect to header member 102. Electrical terminal 108 mounts an electrically conductive contact 114 at one end thereof, as shown. Switch 100 further includes an electrically conductive, contact-carrying spring member 116, which is electrically connected to and cantilever mounted adjacent one end thereof, on a portion 118 of terminal member 110, as shown.

Spring member 116 carries an electrical contact 120 adjacent the free end thereof. Contact 120 is positioned for movement into and out of engagement with stationary contact 114, as shown. Spring member 116 may be formed, for example, of beryllium copper and is spring biased to move contact 120 in a direction away from engagement with stationary contact 114, toward the solid-line position shown in FIG. 2. Switch 100 is positioned and received within the compartment or cup-like recess 40 of casing 14, as shown. The inner peripherally extending wall of casing member 14 may be recessed, as at 42, to provide a shoulder 44 to position and limit the extent of insertion of switch 100 into casing 14. Switch 100 is secured to and preferably (though not necessarily) hermetically sealed within casing 14, as by welding of header 102 to the wall of casing 14, as at 122, as shown in FIG. 2.

Casing member 14 of device 11 is provided with an adjustable calibrating or stop member 130, as shown, the operation and function of which will be described in greater detail below. Adjustable member 130 is received in threaded engagement within a centrally located threaded aperture 132 provided in the upper wall 136 of casing member 14, as shown.

Member 130 provides a centrally located open-ended aperture 138, which corresponds to aperture 32 in the primary subassembly shown in FIG. 1. Aperture 138 is initially employed for admitting a source of predetermined pressure for forming the disc blank 20 into it snap-acting configuration, as shown in dashed lines in FIG. 1 and in solid lines in FIG. 2. After aperture 138 has served its function during the forming operation, a motion-transfer pin 140 formed of electrically insulating material (for example, a ceramic or a phenolic resinous material) is inserted into aperture 138. The length of pin 140 is such that it will engage the underside of snap-acting diaphragm member 20 when the latter is in the solid-line stable position, as shown in FIG. 2, and will also engage an upper portion of spring arm 116 intermediate its ends when the latter is in its normal, contacts-open position, as shown in solid lines in FIG. 2. Upon the application of a perdetermined pressure through port 30, diaphragm 20 will snap downwardly to assume an opposite, concave shape, as shown in dashed lines in FIG. 2. Diaphragm 20, in snapping from the solid-line to the dashed-line FIG. 2 position, effects a downward movement of motion-transfer pin 140, which in turn effects movement of contact arm 116 to move contact 120 from the solid-line contacts open position to the dashed-line contacts-closed position, as shown in FIG. 2. Upon release of the pressure applied through port 30 or upon a predetermined diminishing of this pressure, disc or diaphragm member 20 will snap back from the dashed-line position to the solid-line position, and permit contact 120 to move out of engagement with contact 114 under the bias of spring arm 116.

The present invention also provides means for protecting the diaphragm or disc 20 from becoming deformed and deleteriously changing its calibration when the latter is subjected to very high overpressures admitted through port 30 during its operational life. This protective means takes the form of a sloping surface 34 provided on the upper portion of upper wall 136 of casing 14. Surface 34 serves to define a portion of the cavity 18 and as shown, surface 34 slopes downwardly toward the center and provides a surface configuration which approximates the concave shape of diaphragm 20 when the latter is in the tripped, dashed-line configuration or position, as shown in FIG. 2. Surface 34 thus provides a stop for the diaphragm to seat and bear against after it has snapped (to the FIG. 2 dashed-line position) to prevent deformation of the disc 20, when the latter is subjected to high overpressures. By overpressures is meant pressures considerably in excess of that required to snap the disc from the solid-line position to the dashed-line position shown in FIG. 2. Pressure switches according to the invention, can thus advantageously be made insensitive to high overpressures. For example, switches according to the instant invention have been subjected to overpressures as high as 1000% of rated pressure, and have withstood these overpressures without incurring any deleterious changes in calibration of the pressure-sensing diaphragm member.

Diaphragm 20 of device 11 can also be further calibrated after the forming operation to vary the pressure at which member 20 will snap back to the solid-line position from the dashed-line FIG. 2 position, if it is desired not to utilize the protective overpressure advantages afforded by surface 34. This calibration may be effected by suitable rotation of stop or calibration member 130 to project into compartment or cavity 18. When member 130 is moved from the inoperative position, shown in FIG. 2 (in which it is substantially flush with protective concave surface 34), to the projecting position, as shown in FIG. 3, diaphragm 20 will engage and abut member 130 when it snaps from the solid to the dashed-line configuration shown in FIGS. 2 and 3. The farther stop member 130 projects into cavity 18, the greater will be the pressure at which the diaphragm 20 will snap back to its initial or solid-line stable position. Stated another way, as stop member 130 is inserted further into cavity 18, diaphragm member 20 will require a smaller diminishment or reduction of the pressure applied through port 30 before the diaphragm member will snap back to its initial solid-line position. Thus, the pressure differential (i.e. the difference between the pressure at which diaphragm 20 will snap from the solid to the dashed-line position, and that pressure at which the diaphragm 20 will snap from the dashed-line back to the initial solid-line position) can easily and accurately be controlled by suitable rotation of threaded stop 130. The depth of protective overpressure surface 34 can also be varied to calibrate the snap-acting diaphragm 20 to vary the pressures at which it will snap back to its initial position while at the same time, the effectiveness and advantages of the protective overpressure surface 34 can be preserved.

FIGURE 3 EMBODIMENT

In FIG. 3 is shown another embodiment, generally indicated at numeral 11', which embodiment is similar to that of FIG. 2, in which like numerals designate correspondingly like parts. The embodiment of FIG. 3 differs from the embodiment in FIG. 2 mainly in the provision of an upper adjustable calibrating stop 150. Member 150 includes a threaded shank portion 152 which is received in threaded engagement within a threaded aperture 154 provided in casing member 12, as shown. Casing member 12 also provides an orifice or open-ended inlet aperture 30' which corresponds in function to orifice 30 in the FIG. 2 embodiment.

Calibrating stop 150 includes a flange portion 156 against which snap-acting diaphragm member 20 bears when in the solid-line stable, concave position, shown in FIG. 3. As member 150 is rotated and moved downwardly against the central portion of the dished portion of snap-acting member 20, the pressure required for causing the disc to snap downwardly (as seen in FIG. 3) will accordingly be reduced. It will be clear that the more calibrating member 150 is inserted into the chamber 16 while bearing against the upper portion of the diaphragm member 20, the lower will be the pressure required for snapping diaphragm 20 from the solid to the dashed-line position. Calibrating member 150 includes a notched portion 158 which is accessible exteriorly of the device and is adapted to receive a suitable tool, such as a screw driver, for effecting calibration externally of the device.

In the embodiment of FIG. 3, the sloping protective surface 34 has been omitted and adjustable calibrating screw threaded member 130 is shown in an adjusted calibrated position for engagement with the underside of snap-acting diaphragm member 20, when it snaps to the dashed-line position shown in FIG. 3.

Device 11', like device 11, is suitable for actuating an electrical switch, such as switch 100, or other devices. In addition to the advantages afforded by the calibrating member 150, device 11 also provides substantially all of the advantages described above in connection with the embodiment of FIG. 2.

FIGURE 4 EMBODIMENT

In FIG. 4 is shown a fragmentary axial sectional view of another embodiment, generally indicated by the numeral 200, which is generally similar to the FIGS. 2 and 3 embodiments, wherein like numerals designate correspondingly like parts. Device 200 differs mainly from the devices 11 and 11' of the FIGS. 2 and 3 embodiments, in that device 200 is responsive to a combination of predetermined pressure and temperature conditions, as well as also being adapted to constructions providing for independent or exclusive response to either predetermined temperature conditions or predetermined pressure conditions.

Temperature response results from the provision of a composite (e.g. bimetallic) thermally responsive or thermotropic, snap-acting diaphragm member 220, in place of the monolayered diaphragm member 20 in devices 11 and 11'. In FIG. 4, the adjustable calibrating member 130 is shown in an adjusted, inoperative position flush with surface 34 (as in FIG. 2), whereby surface 34 is effective in performing its overpressure protective function, as described above. Composite, thermally responsive diaphragm member 220 is secured to the flange portions 22 and 24 respectively of casing members 12 and 14 at its outer peripheral margin 226, for example, as by heliarc welding in the manner described above for the embodiments of FIGS. 2 and 3. Thermally responsive, composite diaphragm member 220 may advantageously be formed in the same manner as that described above for diaphragm 20, in connection with FIGS. 1–3.

The calibration adjustments 150 and 130 are effective not only to vary or adjust the pressure at which the diaphragm will snap from one configuration or position of concavity to another, but also to adjust or vary the temperature at which such snapping will take place. Thus, the calibrating members 130 and 150 can also effect adjustment of the combined effects of the pressure and temperature conditions at which snapping will take place. Where it is desired that snap action of member 220 from the solid-line to the dashed-line position shown in FIG. 4 take place or be influenced in response to a temperature rise (and also at predetermined pressure conditions), layers 221 and 223 of the composite member 220 would respectively be the high and low expansion sides. Where it is desired that snap action from the solid to the dashed-line position take place or be influenced in response to a temperature drop, side or layer 223 would then be the high expansion side, and layer 221 would be the low expansion side. The pressure-responsive device 200 can be employed with an electrical switch 100, such as shown in FIG. 2, or with any other device for which actuation is desired.

The pressure-responsive switch 200 provides substantially all of the advantages described above for the embodiments of FIGS. 2 and 3, and also provides the advantage of combined pressure and temperature sensing operation, as well as individual or exclusive temperature or pressure-sensing operation. It will be understood that device 200 will provide for exclusive temperature response at a given or constant set of pressure conditions, and will also provide for exclusive pressure response at a given or constant set of temperature conditions.

In the embodiment of FIGS. 2–4, although it is generally preferred that during the forming operation, the disc be free to assume a deformed shape in response to the forming pressure applied through the aperture 32 or 138, and that member 150 be maintained out of engagement with the diaphragm during the forming operation, there may be situations in which it is preferred to dispose stop 150 for engagement with the diaphragm member when bulging and forming takes place, so as to provide certain specific operating snap-acting characteristics.

Further, according to our invention, a reverse forming step may be desirable in some cases to achieve certain specific operating characteristics for the formed diaphragm member. This reverse forming step is applicable both to the snap-acting device in the FIGS. 2–4 embodiments, as well as to the creep-acting diaphragm member of the FIG. 5 embodiment. In carrying out the reverse forming step, forming pressure is applied to the diaphragm member in a direction opposite to that described above in the forming steps for the various embodiments.

FIGURE 5 EMBODIMENT

In FIG. 5, there is shown another embodiment of the present invention, generally indicated at numeral 300. In FIG. 5, the various subassemblies of device 300 are shown in expanded, cross-sectional elevation. Pressure-responsive device 300 generally comprises first and second casing members 312 and 314, each of which respectively provide a chamber or cavity 316 and 318 therein, as shown. Disposed intermediate casing members 312 and 314 is an imperforate diaphragm member 320, preferably in the form of a relatively thin, flat, metal blank. Casing members 312 and 314 are each respectively provided with a peripherally extending flange 322 and 324. Flanges 322 and 324 oppose and abut each other and sandwich therebetween a marginal, peripherally extending portion 326 of diaphragm 320. Flanges 322 and 324 are secured to portion 326, as by heliarc welding, as at 328, to seal and rigidly join the parts. Diaphragm member 320, when so secured to casing members 312 and 314, separates and seals compartments or cavities 316 and 318 from each other in the manner described above for diaphragm 20 in the embodiments of FIGS. 2 and 3. Each of casing members 312 and 314, and diaphragm 320, are preferably cylindrical or circular in cross section, although other shapes and configurations may be employed. Casing member 312 is provided with an aperture or port 330, which extends through a projecting, externally threaded, fitting portion 331 which is provided on casing member 312, for connecting the device 300 to a source of pressure to be sensed or for forming of the diaphragm member in the manner to be more fully described below.

The upper surface 334 of casing member 314 is opposite one side of the diaphragm member 320 and defines a part of the cavity 318, and comprises a convoluted surface. The convolutions defining convoluted surface 334 are circular and substantially concentric. Convoluted surface 334 also slopes inwardly toward a central portion of the surface, thereby providing a slightly concave, cross-sectional configuration effect to provide for protection of the diaphragm against deformation and deleterious calibration shifts when the device is subjected to very high overpressures. In this respect, convoluted surface 334 corresponds to the protective sloping surface 34 of the embodiments of FIGS. 2 and 4.

After casing members 312, 314 and the diaphragm 320 (preferably in flat blank form) have been secured together as a subassembly, as described above, a forming operation for the diaphragm takes place. It will be noted that in some cases, the diaphragm blank can be in a partially preformed condition. A predetermined fluid pressure is applied through orifice or port 330 against the upper side of the diaphragm blank member 320 to effect deformation of the diaphragm member downwardly, as seen in FIG. 5. The fluid pressure will cause the diaphragm member to be stressed and bulged downwardly against the convoluted surface 334. During this fluid pressure forming operation, diaphragm blank 320 will be stressed and bulged downwardly (from the solid-line blank configuration to the dashed-line FIG. 5 configuration) to permanently deform member 320 into assuming a convoluted shape corresponding or similar to that of convoluted surface 334. The convoluted shape which the diaphragm member initially resumes while under the forming pressure is shown in dashed lines in FIG. 5, and in solid lines in FIG. 5a. When the forming pressure is relieved at port 330, the diaphragm member will elastically partially return from the solid-line position shown in FIG. 5a to a permanently deformed convoluted configuration shown in dashed lines in FIG. 5a and in solid lines in FIG. 6. The dashed-line configuration in FIG. 5a and the solid-line configuration in FIG. 6 represents the final formed convoluted configuration of the diaphragm member 320.

When the fitting portion 331 is connected to a source of pressure which is to be sensed, the diaphragm member will move or flex from its normal convoluted solid-line position shown in FIG. 6, downwardly toward or against the convoluted surface 334 generating an actuating movement.

Casing 314 is provided with a centrally located aperture 338 in which is received a motion-transfer pin 340, formed of an electrically insulating material, preferably ceramic. Aperture 338 includes a reduced diameter portion 339 providing a shoulder 341 which cooperates with a shoulder 343 on the pin 340 to limit relative sliding movement of the pin within the aperture 338, in a downward direction, as seen in FIG. 6. The pin 340 is shown in its lowermost position in FIG. 5. As clearly shown in FIG. 6, the upper surface of pin 340 abuts and engages the lower surface of diaphragm member 320 for movement therewith when member 320 flexes downwardly upon the application of a predetermined pressure through port 330.

Casing members 312, 314, diaphragm 320 and motion-transfer pin 340 comprise a separate subassembly which can conveniently be mass produced, and later conveniently secured to the other portions comprising device 300. It will be understood that motion-transfer pin 340 is inserted into aperture 338 prior to securing diaphragm 320 and casing members 312 and 314 together.

Pressure-responsive device 300 includes a third cup-like casing member 350. Casing member 350 is generally similar in cross-sectional configuration to casing members 312 and 314, and includes a peripherally extending flange 352. Flange 352 mates and closely interfits with, and is also rigidly secured to, flange 324 of casing 314, as clearly shown in FIGS. 5 and 6, as by heliarc welding as at 354.

Referring now to FIG. 5, casing 350 provides two cup-like cylindrical, hollow portions 360 and 362. Cylindrical hollow portion 362 has a somewhat smaller diameter than that of cylindrical portion 360, as shown. Cylindrical hollow cavity or portion 360 is internally threaded, as at 361. Mounted in adjustable, threaded engagement within threaded cavity 360 is an externally threaded mounting ring 364. Mounting ring 364 is preferably circular in cross section and provides a circumferentially extending ledge or shoulder portion 366 on which is supported a snap-acting, monolayered spring disc 370. Disc 370 is of the automatically resettable type, its only position of relative stability being shown in solid lines in FIGS. 5 and 6.

Snap-acting disc 370 is preferably circular in shape and is formed of a single, metal layer which can be imperforate or foraminous. Snap-acting spring or disc 370 is maintained on ledge 366 of mounting ring 364 by means of a snap ring type washer 375 which is disposed and received within a suitably formed peripherally and circumferentially extending notch 374 provided in mounting ring 364. The subassembly comprising mounting ring 364, snap-acting spring disc 370, and snap ring 375 is inserted into threaded engagement with threaded cavity 360 from the open-ended top of casing member 350, before the latter is secured or welded to casing member 314. After casing members 312, 314 and 350, and their accompanying parts, have been assembled together to form a subassembly unit as shown in the upper portion of FIG. 5, disc mounting or retaining ring 364 is rotated in its threaded aperture 361 until a proper relationship between the spring disc 370, a motion-transfer pin 340, and the formed convoluted diaphragm member 320 is obtained. In the proper calibrated position, the upper portion of motion-transfer pin 340 will abut the diaphragm member 320, and the lower portion of motion-transfer pin 340 will abut the upper surface of spring washer 370, as shown in solid lines in FIG. 6. Snap-acting spring mounting ring 364 includes a pair of notched portions 378 for reception of a suitable tool to facilitate rotation of the ring 364 and calibration of the device, through the open-ended cavity 362. Open-ended cylindrical cavity 362, which corresponds in function to cavity 40 of casing member 14 in the embodiment of FIGS. 2, 3 and 4, is adapted to receive and mount an electrical switch mechanism, generally referred to by 400. The portion of casing 350 adjacent the open end of cylindrical cavity 362, is provided with a circumferentially extending flange 380, which mates and interfits with a circumferentially extending flange 401 provided on switch 400, as shown.

Switch 400 is conveniently mounted and hermetically sealed within cavity 362, as by heliarc welding flanges 380 and 401, as at 403. Switch 400 is generally similar to electrical switch 100 of the embodiments of FIGS. 2–4, and it will be understood that like numerals designate correspondingly like parts. Switch 400 differs basically from the switch 100 in the provision of the flange 401, the peripheral configuration of header plate 102 wherein it mates with the flange 380 in cavity 362 of casing 350, and also in the arrangement of the spring arm member 416 which mounts the movable contact 120.

Spring arm 416 is formed of electrically conductive material, such as beryllium copper, and is cantilever mounted and electrically connected at one end to portion 118 of terminal 110, as shown. Spring arm 416 mounts and is electrically connected to a movable contact 120 adjacent its free end, as shown. Spring arm 416 is spring biased to move contact 120 in a direction away from stationary contact 114, and thus switch 400, like switch 100, comprises a normally open switch. Spring arm 416 further mounts an abutment member 420 intermediate its ends, as shown. Abutment member 420 intermediate its ends, as shown. Abutment member 420 includes a reduced diameter portion or post 422 which is inserted into an opening provided in spring member 416. The opening in spring member 416, which receives post 422, is provided with integrally formed, struck-out gripping fingers 424, which extend toward each other into clutching or gripping relationship with the post 422. The clutching fingers 424 support the abutment member 420 in any desired position by frictional and biting engagement with the post or reduced diameter portion 422. Abutment member 420 is formed of an electrically insulating material, such as for example, a ceramic or phenolic material. The nonmetallic character of the abutment facilitates the gripping action of gripping fingers 424.

After switch 400 is mounted on casing 350, as shown in FIG. 6, the upper surface of abutment 420 is spaced a predetermined amount from the lower surface of the central portion of snap-acting spring member 370, when the latter is in the solid-line position, as clearly shown in FIG. 6.

Operation of pressure-responsive device 300 is as follows: Referring to FIG. 6, diaphragm 320 will move from the solid to the dashed-line position (in which the convoluted diaphragm is substantially flush with the protective, convoluted, concave surface 334) upon the application of a predetermined fluid pressure through orifice 330. Diaphragm 320, in moving from the solid to the dashed-line position in FIG. 6, is effective to move the motion-transfer pin downwardly from the solid to the dashed-line position, until shoulder 343 of the pin 340 mates and engages the stop shoulder 341 provided by aperture 338. Motion-transfer pin 340, in moving downwardly, exerts a force against the central portion of the snap-acting spring member 370, to cause the spring member to overcenter and snap from the solid to the dashed-line position shown in FIG. 6. Snap-acting spring member 370, in snapping from the solid to the dashed-line position, moves into engagement with abutment member 420, and moves the contact-carrying arm 416 and movable contact 120 downwardly, into a contacts-closed position, as suggested by the dashed lines in FIG. 6. The parts will maintain their dashed-line, contacts-closed position as long as the predetermined fluid pressure is applied against the diaphragm through port or orifice 330. When this force is removed or sufficiently diminished, diaphragm 320 will move upwardly, under its resilient elastic bias, thereby removing the force applied to the snap-acting spring member 370 to permit the latter to snap back to the solid-line stable position. Thereafter, contact-carrying spring member 416 will be free to move movable contact 120 out of engagement with stationary contact 114, under its resilient bias.

The depth of convolutions in the diaphragm, and also in the protective surface, can be varied to vary operating characteristics. Correspondingly, in the embodiments of FIGS. 2–4, operating conditions and actuating pressure characteristics can be varied by varying the depth and the nature of the deformation in the snap-acting diaphragm member.

According to the present invention, the diaphragm configuration is advantageously formed after the parts have been assembled into a subassembly, thus avoiding extra handling and minimizing the number of operations required, permitting more rapid and less costly manufacture. The fluid pressures employed for forming of the diaphragm in each of the embodiments, as well as the fluid pressures which the device will sense and effect actuation, may be either hydraulic or gaseous. However, in the forming operation, it is preferred that a liquid be employed. The sealing between compartments or cavities, e.g. 16 and 18, by the diaphragm member, advantageously facilitates the forming in place operation described above.

While it is preferred that the cavities, for example, cavities 16 and 18 in the embodiment of FIG. 2, be hermetically sealed from each other, which hermetic sealing is advantageously accomplished by the sealing action of the diaphragm member according to the present invention, it should be understood that there may be some cases in which these two chambers need only be adequately sealed against the entry of the pressure creating medium, for example, during the forming operation. It will be understood that the parts may be sealed and clamped against the marginal periphery of the diaphragm member by means other than welding or heliarc welding. For example, a clamping arrangement which utilizes an O-ring for sealing (not shown) can, in some cases, be employed instead of heliarc welding.

It will be understood that with the preferred hermetically sealed arrangement, the pressure and/or temperature sensing diaphragms, in the embodiments of FIGS. 2–4, or the convoluted creep-type diaphragm in the embodiment of FIG. 5, will sense a constant or absolute pressure change, while in those constructions which are not hermetically sealed, the pressure-sensing diaphragm will sense gauge pressure, i.e. the difference in applied pressure to one side of the diaphragm (e.g. as through port 30 in the embodiments of FIGS. 2–4, or through port 330 in the embodiment of FIG. 5) as against varying pressure or atmospheric pressure exerted against the other side of the diaphragm.

Advantageously, the diaphragm members according to the present invention, are formed in situ conveniently in the pressure-sensing device itself, which device does not require the provision of any additional structure to accomplish the forming operation.

Further, because the diaphragm member is formed in situ in the pressure-responsive device itself after assembly of the parts, economy in assembling the parts is realized. It is considerably more economical and expedient to weld a flat blank plate to each of the two casing members, than would be with an already formed plate wherein great care and control would have to be exercised to ensure that the formed characteristics of the diaphragm member are not altered during assembly. The present invention advantageously avoids these problems.

In each of the embodiments, according to the present invention, positive contact force is obtained immediately after snap action takes place, and this positive contact force is sustained until the pressure being sensed is removed or diminishes to a predetermined amount whereby reverse snap action will occur to permit the contacts to move to a contacts-open position under the resilient spring bias of the contact-carrying arm. This arrangement advantageously eliminates or at least minimizes contact resistance.

While the electrical switch embodiments shown and described involve normally-open contact arrangements which close on a predetermined pressure increase, it should be understood that other arrangements can also be provided within the purview of this invention, for example, a normally closed arrangement (not shown) wherein the contacts open upon a predetermined increase in pressure, or a double-throw arrangement (not shown).

It is possible to render the pressure-sensing operation of each of the embodiments of FIGS. 2, 3 and 5 relatively insensitive to temperature conditions by forming the casing members (12 and 14 of the FIGS. 2 and 3 embodiments, and 312 and 314 of the FIG. 5 embodiment) of materials having substantially the same coefficients of thermal expansion.

Conversely, each of the embodiments of FIGS. 2, 3 and 5 can be constructed so as to be responsive to a predetermined combination of pressure and temperature conditions by making the casing members and the diaphragm member of materials having different coefficients of thermal expansion, for example, brass and Invar.

In view of the above, it will be seen that the several objects of the invention are achieved, and other advantageous results attained.

As many changes could be made in the above constructions and methods without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

We claim:
1. A pressure-responsive device comprising first and second casing members; said first casing member providing a first cavity and said second casing member providing a second cavity; a snap-acting diaphragm member positioned intermediate said first and second casing members; each of said first and second casing members being secured to said diaphragm member adjacent the marginal periphery thereof so that said member separates and seals said first cavity from said second cavity; said diaphragm member having a deformed portion therein responsible for its snap action; said first casing member providing an orifice communicating with said first cavity to admit fluid under pressure against one side of said diaphragm to effect snap action of said diaphragm in response to said pressure in a direction toward said second casing member; said first casing member including a first calibration stop member projecting into said first cavity for calibrating said snap-acting diaphragm member, said first calibration stop member being engageable with the deformed portion of said snap-acting diaphragm member in one position thereof for varying the pressures required to effect snap action thereof in at least one direction without deleteriously affecting the snap action of the diaphragm member; and a second calibration stop member adjustably mounted on the second casing member and engaging the deformed portion of the snap-acting diaphragm in a second position thereof.

2. A condition responsive device comprising first and second casing members; said first casing member providing a first cavity and said second casing member providing a second cavity; a thermally responsive, snap-acting diaphragm member positioned intermediate said first and second casing members; each of said first and second casing members being secured to said diaphragm member adjacent the marginal periphery thereof so that said member separates and seals said first cavity from said second cavity; said diaphragm member having a deformed portion therein responsible for its snap action; said first casing member providing an orifice communicating with said first cavity to admit fluid under pressure against one side of said diaphragm to effect snap action of said diaphragm in response to said pressure in a direction toward said second casing member; said first casing member including a first calibration stop member projecting into said first cavity and being engageable with the deformed portion of said thermally responsive, snap-acting diaphragm member in one position thereof for varying the pressure and temperature at which said diaphragm member will snap in at least one direction without deleteriously affecting the snap action of the diaphragm member, said first calibration stop member being arranged for manipulation externally of said first casing member for effecting adjustment thereof; and a second calibration stop member adjustably mounted on the second casing member and engaging the deformed portion of the snap-acting diaphragm in a second position thereof.

3. A pressure-responsive device comprising first and second casing members; said first casing member providing a first cavity and said second casing member providing a second cavity; a snap-acting diaphragm member positioned intermediate said first and second casing members; each of said first and second casing members being secured to said diaphragm member adjacent the marginal periphery thereof so that said member separates and seals said first cavity from said second cavity; said diaphragm member having a deformed portion therein responsible for its snap action; said second cavity being defined by a surface disposed opposite the other side of said diaphragm member; said surface sloping in a direction away from said other side of said diaphragm member toward a central portion of said surface; said first casing member providing an orifice communicating with said first cavity to admit fluid under pressure against one side of said diaphragm to effect snap action of said diaphragm in response to said pressure in a direction toward said surface, whereby said surface acts as a stop to limit movement of said diaphragm and prevent deleterious calibration shifts of said diaphragm when said device is subjected to pressures beyond a predetermined amount; one of said first and second casing members including a first calibration stop member projecting into one of said first and second cavities for calibrating said snap-acting diaphragm member; said first calibration stop member being engageable with the deformed portion of said snap-acting diaphragm member in one position thereof for varying the pressures required to effect snap action thereof in at least one direction; and a second calibration stop member adjustably mounted on the second casing member and engaging the deformed portion of the snap-acting diaphragm in a second position thereof.

4. A pressure-responsive device comprising first and second casing members; said first casing member providing a first cavity and said second casing member providing a second cavity; a snap-acting diaphragm member positioned intermediate said first and second casing members; each of said first and second casing members being secured to said diaphragm member adjacent the marginal periphery thereof so that said member separates and seals said first cavity from said second cavity; said diaphragm member having a deformed portion therein responsible for its snap action; said second cavity being defined by a surface disposed opposite the other side of said diaphragm member; said surface sloping in a direction away from said other side of said diaphragm member toward a central portion of said surface; said first casing member providing an orifice communicating with said first cavity to admit fluid under pressure against one side of said diaphragm to effect snap action of said diaphragm in response to said pressure in a direction toward said surface, whereby said surface acts as a stop to limit movement of said diaphragm and prevent deleterious calibration shifts of said diaphragm when said device is subjected to pressures beyond a predetermined amount; said first casing member including a first adjustable calibration stop member projecting into the cavity therein for calibrating said snap-acting diaphragm member; said first adjustable calibration stop member being actuable externally of said casing member for effecting adjustment thereof; said adjustable calibration stop member being engageable with the deformed portion of said snap-acting diaphragm member in one position thereof for varying the pressure required to effect snap action thereof; said second casing member mounting and positioning an electrical switch for actuation thereof in response to snapping of said diaphragm member; said second casing member providing an aperture communicating with said second cavity; said switch comprising a pair of electrical contacts; means mounting one of said electrical contacts for movement into and out of engagement with the other of said electrical contacts in response to movement of said snap-acting diaphragm member; motion-transfer means positioned intermediate and for engagement with said diaphragm member and said means, part of said motion-transfer means being disposed in said aperture for engagement by said diaphragm member and for reciprocal movement therein; and a second calibration stop member adjustably mounted on the second casing member and engaging the deformed portion of the snap-acting diaphragm in a second position thereof.

5. The pressure-responsive device as set forth in claim 4 and wherein said second casing member includes a cup-shaped portion in which said electrical switch is mounted and hermetically sealed.

6. A pressure-responsive device comprising first and second casing members; said first casing member providing a first cavity and said second casing member providing a second cavity; a snap-acting diaphragm member positioned intermediate said first and second casing members; each of said first and second casing members being secured to said diaphragm member adjacent the marginal periphery thereof so that said member separates and seals said first cavity from said second cavity; said diaphragm member having a deformed portion therein responsible for its snap action; said first casing member providing an orifice communicating with said first cavity to admit fluid under pressure against one side of said diaphragm to effect snap action of said diaphragm in response to said pressure in a direction toward said second casing member; said second casing member adjustably mounting a first calibrating stop member; said first calibrating stop member extending into said second cavity and positioned for engagement with the deformed portion of said diaphragm member in one position thereof whereby the pressure at which said diaphragm member will snap from said one position to another can be varied by varying the relation between said calibrating stop member and said snap-acting diaphragm member without deleteriously affecting the snap action of the diaphragm member; and a second calibration stop member adjustably mounted on the second casing member and engaging the deformed portion of the snap-acting diaphragm in a second position thereof.

7. A pressure-responsive device comprising first and second casing members; said first casing member providing a first cavity and said second casing member providing a second cavity; a snap-acting diaphragm member positioned intermediate said first and second casing members; each of said first and second casing members being rigidly secured to said diaphragm member adjacent the marginal periphery thereof so that said member separates and seals said first cavity from said second cavity; said diaphragm member having a deformed portion therein responsible for its snap action; said first casing member providing an orifice communicating with said first cavity to admit fluid under pressure against one side of said diaphragm to effect snap action of said diaphragm in response to said pressure in a direction toward said second casing member; said second casing member adjustably mounting first a calibrating member; said calibrating member extending into said second cavity and positioned therein to engage the deformed portion of the diaphragm member at one position thereof whereby the pressure at which said diaphragm member will snap from said one position to an opposite position can be varied by varying the relation between said first calibrating member and said snap-acting diaphragm member; said calibrating member providing an aperture communicating with said second cavity to admit fluid under pressure into said cavity; and said first casing member including a second adjustably mounted calibrating stop member projecting into said first cavity and positioned for engagement with the deformed portion of the other side of said diaphragm member when the latter is in said opposite position whereby the pressure at which said diaphragm member will snap from said opposite position to said one position can be varied by varying the relation between said second calibrating stop member and said snap-acting diaphragm member.

8. A pressure-responsive device comprising first and second casing members; said first casing member providing a first cavity and said second casing member providing a second cavity; a snap-acting diaphragm member positioned intermediate said first and second casing members; each of said first and second casing members being secured to said diaphragm member adjacent the marginal periphery thereof so that said member separates and seals said first cavity from said second cavity; said diaphragm member having a deformed portion therein responsible for its snap action; said first casing member providing an orifice communicating with said first cavity to admit fluid under pressure against one side of said diaphragm to effect snap action of said diaphragm in response to said pressure in a direction toward said second casing member; said second casing member mounting and positioning an electrical switch for actuation thereof in response to snapping of said diaphragm member; said second casing member adjustably mounting a calibrating stop member for engagement with the deformed portion of the diaphragm member in one position thereof whereby the pressure at which said diaphragm member will snap from said one position to another can be varied by varying the relation between said calibrating stop member and said snap-acting diaphragm member; said calibrating stop member providing an aperture communicating with said second cavity; said aperture serving to admit fluid under pressure into said second cavity against said diaphragm to permanently deform said diaphragm to provide said deformed portion therein responsible for its snap action; said switch comprising a pair of electrical contacts; means mounting one of said electrical contacts for movement into and out of engagement with the other of said electrical contacts in response to movement of said snap-acting diaphragm member; motion-transfer means positioned intermediate and for engagement with said diaphragm member and said means, part of said motion-transfer means being disposed in said aperture for engagement by said diaphragm member and for reciprocal movement therein.

9. The pressure-responsive means as set forth in claim 8 and wherein said motion-transfer means comprises a pin member and said means mounting said movable contact comprises a cantilever mounted spring arm, said pin member being engageable with said spring arm intermediate the ends thereof.

10. A pressure-responsive member comprising first and second casing members; said first casing member providing a first cavity and said second casing member providing a second cavity; each of said first and second members including an opposed, aligned, peripherally extending flange; a diaphragm member positioned intermediate said first and second casing members; the flange of each of said first and second casing members being secured to said diaphragm member adjacent the marginal periphery thereof so that said member separates and seals said first cavity from said second cavity; said second cavity being defined in part by a convoluted surface disposed opposite one side of said diaphragm member; said first casing member providing an orifice communicating with said first cavity for admitting fluid under pressure thereinto against the other side of the diaphragm member to effect movement of said diaphragm in response to pressure in a direction toward engagement with said convoluted form corresponding substantially to the convoluted form of said surface; said second casing member mounting and positioning an electrical switch for actuation thereof in response to predetermined movement of said diaphragm member; said electrical switch comprising a pair of electrical contacts; means mounting one of said contacts for movement into and out of engagement with the other of said contacts; said second casing member providing an aperture extending through a central portion of said convoluted surface and communicating with said second cavity; motion-transfer means position intermediate said diaphragm member and said means mounting said movable contact, a part of said motion-transfer means being disposed in said aperture for engagement by said diaphragm member and for reciprocal movement therein; and a snap-acting spring member mounted intermediate said diaphragm member and said means mounting said movable contact; said motion-transfer means comprising a motion-transfer pin member slidably received in said aperture and positioned intermediate said snap-acting spring member and said diaphragm member; said motion-transfer means further including electrically insulating abutment member carried by said means mounting said movable contact; said abutment member being disposed for engagement with said snap-acting spring member when the latter snaps; said abutment member being operative to effect movement of said means mounting said movable contact to actuate said contacts in response to snapping of said snap-acting spring member.

11. The pressure-responsive means as set forth in claim 10 and wherein said second casing member includes a cup-shaped portion in which said electrical switch is mounted and hermetically sealed; at least a part of the interior walls defining said cup-like portion being threaded; a ring-like spring retaining member disposed in threaded engagement with said threaded wall portions; said ring-like member supporting said snap-acting spring member and operative to adjust the position of said spring member with relation to said motion-tarnsfer pin and abutment member.

References Cited

UNITED STATES PATENTS

| 1,183,486 | 5/1916 | Pardue | 200—83 XR |
| 1,684,530 | 8/1928 | Bast | 200—83.2 |
| 2,381,835 | 8/1945 | Moorhead | 200—83.2 XR |
| 2,392,077 | 1/1946 | Wilson | 200—83.2 XR |
| 2,381,737 | 1/1952 | West | 200—83.4 XR |
| 3,121,903 | 3/1964 | Flanagan | 300—83.4 XR |

FOREIGN PATENTS 886,446 7/1943 France.

BERNARD A. GILHEANY, *Primary Examiner.*

H. B. GILSON, H. M. FLECK, G. MAIER,
*Assistant Examiners.*